IMAGE-TO-CODE TRANSLATION SYSTEM

Filed June 11, 1957

INVENTOR.
JOSEPH T. McNANEY
BY Egon W. Mueller
ATTORNEY.

United States Patent Office 2,859,427

Patented Nov. 4, 1958

2,859,427

IMAGE-TO-CODE TRANSLATION SYSTEM

Joseph T. McNaney, La Mesa, Calif., assignor to General Dynamics Corporation, Rochester, N. Y., a corporation of Delaware Application June 11, 1957, Serial No. 664,945

6 Claims. (Cl. 340—149)

This invention relates generally to a system for converting images, such as printed characters, into coded information.

In present day high speed computing devices, it is generally necessary for an operator to read the information, which is desired to be presented to the computer, from a printed page, for instance, and, to then punch appropriate keys recording the information as a code upon punched tapes, cards, or magnetic tapes. The code makes such information acceptable to the computer mechanism. Therefore, ordinary use of computers demands such time consuming, laborious and inefficient human transfer of information from a printed or written page into coded information acceptable to the computer, before the computer can either store or use the information so presented.

The present invention presents a solution to this problem and effects direct read in of printed or typed predetermined images, such as characters, numerals, letters and the like, from the original paper, and directly converting such images to code. The invention employs illumination or shadowing of printed, punched or typed images from paper, or the like, onto a light responsive screen of a cathode ray tube. The cathode ray tube so employed, is capable of displaying a plurality of like predetermined images electronically upon its target or screen. The screen or target of the tube is provided with a conductive layer disposed directly upon the tube, and has a light responsive layer, such as a photoconductive material, overlaid upon the conductive layer. Therefore, as an image is optically projected through the conducting layer onto the light responsive layer, the light responsive layer will become conducting in the areas illuminated by the image. When, therefore, the like image is projected by the electron beam of the cathode ray tube, there is established a condition of coincidence between the images and also of equilibrium in an external circuit, there being no current flow at that moment from the electron beam through the conducting layer to a means external of the tube which is capable of, circuitwise, establishing coincidence between the coded information furnished to the tube to project the character and at the same time present that coded information to an output. Therefore, only upon coincidence of the images at the target, will an output be generated which is the same output as that generated by a code generator for presentation of the image by the cathode ray tube. This system then provides a very simple and trouble-free image-to-code conversion system.

In addition to the afore-enumerated objects and advantages, it is an object of this invention to provide a system capable of translating the printed image from paper or like material into coded information usable by a computer.

It is another object of this invention to provide an image-to-code translating system which is capable of operating at the extremely high speeds and is substantially inertialess.

Objects and advantages other than those set forth above will be apparent when read in connection with the accompanying specification and drawings, in which.

Figures 1, 2, 3:
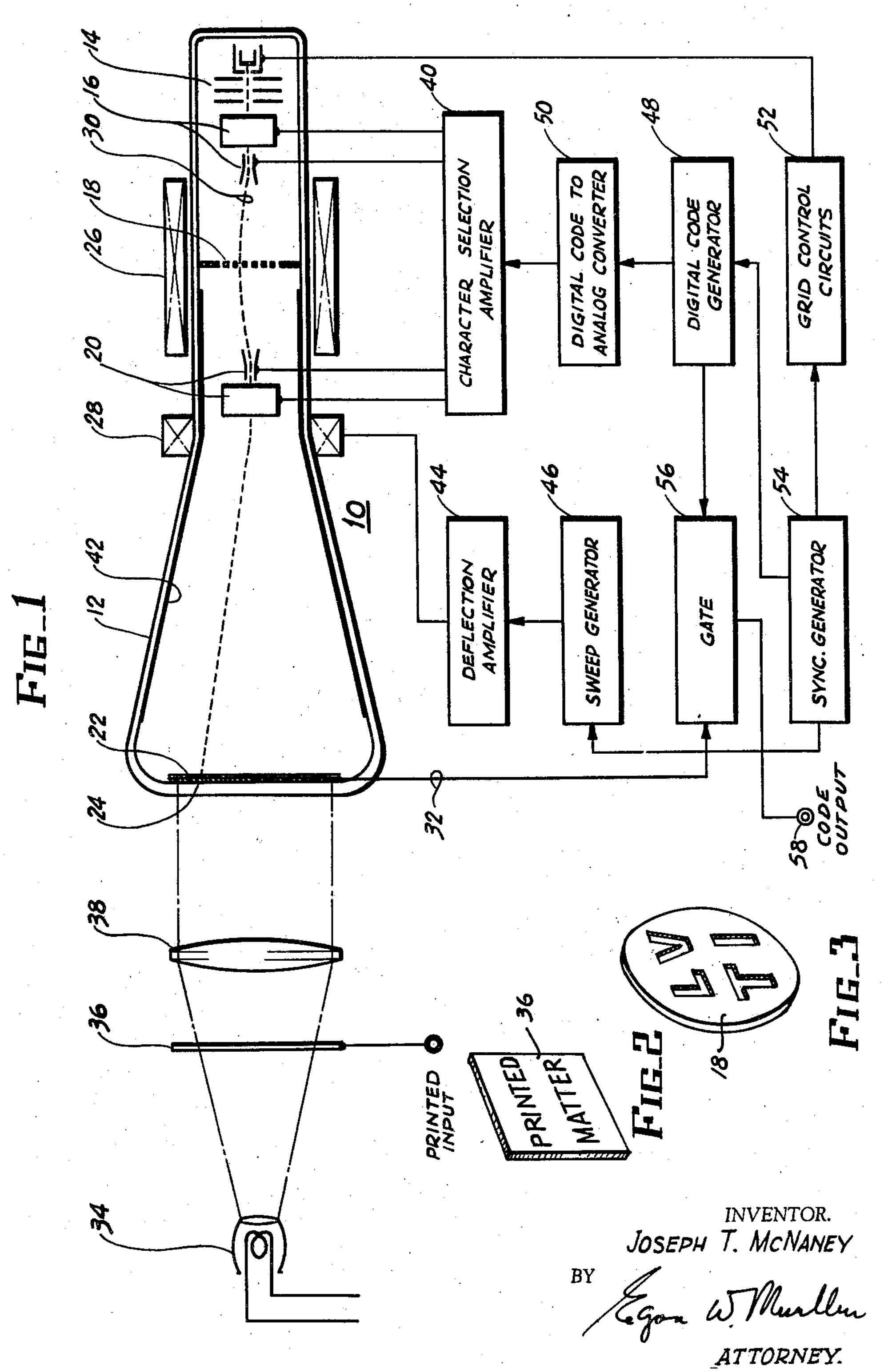
Figure 1 is a schematic view of the system embodying the invention.
Figure 2 illustrates printed matter that may be illuminated for conversion into coded information.
Figure 3 illustrates a beam-shaping member for use in the invention.

The system for translating or converting predetermined images into coded information, as shown schematically in Figure 1, includes generally a cathode ray tube 10 associated with energizing and actuating means or circuitry, which, together with means for optically projecting predetermined images onto the responsive target of the tube effects the stated translating.

Generally speaking, the tube 10 may present individual images, or, cycle a group of desired images, displaying such predetermined images upon a target 22, 24, where with images projected from a printed page, or the like, and optically projected onto the target 22, 24, upon establishment of coincidence or substantial congruency between the two images, a predetermined code matching the congruent images is presented as an output.

The component somewhat fundamental to operation of the present invention is the shaped beam tube 10. The shaped beam tube is shown and described in several of its forms in my U. S. Patents 2,283,383, 2,735,956, 2,761,988 and others. The tube 10 comprises an evacuated envelope 12 having positioned therewithin an electron gun 14, a first set of deflection plates 16, a beam-forming member 18 (presenting character shaped openings or a plurality of predetermined images as shown in Figure 3), a second set of deflection plates 20, and a light radiation responsive layer or target 22 supported on an optically transparent electrically conducting layer or target 24 all upon the face of the tube. External to the tube, and supported in cooperative relation with the elements inside the tube, is an electron beam convergence coil 26, and a beam deflection yoke 28. Both the coil 26 and yoke 28 are capable of electromagnetically influencing an electron beam 30 generated and projected by electron gun 14 toward target 22, 24.

In operation, the electron beam 30 from the gun 14 may be deflected by deflection plates 16 through a character shaped opening in the beam-forming member 18. In the selection of the opening in the beam-forming member 18, the beam 30, comes under the influence of the magnetic field of the coil 26 which field effects focus and convergence of the cross section of the beam 30 and generally directs the beam toward the axis of the tube 10. The deflection plates 20 effect return of the beam 30 to the axis just prior to its further control by the deflection yoke 28. The deflection yoke 28 effects redirection of the beam 30 to any desired position on the target 22.

Target 22, the light radiation responsive layer, utilizes a photoconductor material, such as, selenium, zinc sulfide or cadmium sulfide or any of the other known substances which have a high electrical resistance in the absence of light radiation and change to a low electrical resistance in the presence of light radiation. The conductive layer or target 24 need merely be a conductor which is optically transparent to light radiation and electrically conductive. An example of a well known material that may be used for this purpose is a conductive material produced by Pittsburgh Plate Glass Co., under the trademark "Nesa" transparent conductive material. This material is described in the 3rd paragraph of page 471 and on page 531 of the book entitled "An Introduction to Luminescence of Solids" written by Humboldt W. Leverenz and published by John Wiley & Sons, Inc. (copyright 1950). The conductive target 24 will serve as an anode for the electron beam together with the light responsive target 24 in the tube 10. Conductive target 24 has an external connection to external circuitry, namely gate 56, by means of a lead-through conductor 32. Gate 56 may be any of the well known gating circuits.

The light responsive target 22 being of high electrical resistance in the absence of light will not respond as an anode; it may, however, be made selectively responsive by projection of light thereupon from an externally positioned and controlled light source 34, 36 and 38. One example of such a light source, as shown in Figure 1, includes a light generator 34, such as a light bulb, a light modulator 36, which contains one or more predetermined images upon an opaque or translucent material as shown in Figure 2, and a lens 38 to focus the modulated light rays, in the shape of shadowed or light images, as desired, through the conductive target 24 and upon light responsive target 22. It should be understood, however, that other methods may be used to shadow or image predetermined images upon the light rseponsive target 22, such as, but not limited to, light beam scanning methods which are well known in the art, or reflecting light onto the surface of the light responsive target from illuminated surfaces of discrete character sizes and shapes. The light image, of the predetermined image presented by the printed input or light modulator 38, when projected upon the light responsive layer 22 reduces the resistance of the illuminated area corresponding to the projected light image and in effect creates thereupon an anode of predetermined size and cross-section which is then compared in size and cross-section, respectively, with that of the congruent image of electron beam 30. If desired, of course, it is possible by means of the light source, to effect non-conducting areas of predetermined size and cross-section upon the light responsive layer 22, which areas may be established and compared with the independently shaped cross sections of the selected electron beam 30. In either case, if coincidence is effected, no electrons from the electron beam pass to the conductive layer to conductor 32 and gate 56 opens. In all other cases where coincidence is not established, current from the beam will flow through the anode targets 22, 24 and keep gate 56 closed.

In the following explanation of the system's operation, exemplified by the diagram of Figure 1, the creation of non-conducting areas of predetermined size and cross-section, corresponding to predetermined images, will be considered. The images to be projected upon target 22 should generally be so chosen and focused as to correspond in size and cross section with the cross section projected upon target 22 by electron beam 30 or vice versa. The two images stated, should each be of a predetermined image configuration, which when projected upon target 22 will be congruent to one another. The creation of such areas through predetermined image shadowing or projecting upon target 22 is effected by passage of light rays through the modulator 36. For more practical and exemplary purposes, the light modulator 36 may be referred to as a printed input card 36, see Figure 2, of light transparent or translucent material having printed on one of its surfaces opaque message characters in the form of letters, numerals, symbols, and so forth. As stated, these message characters are predetermined images with regard to their size, cross-section, shape and desired positions on the card 36. Light source 34 being modulated by these message characters in card 36 will be focused by lens system 38 as dark message characters onto the surface of the light responsive layer 22, against an illuminated background. It should be pointed out that the aforestated is exemplary, and the formation of light message characters, by illumination of openings or the light in card 36 is also clearly within the ambit of the invention.

The cross-sections of the printed characters being predetermined images are at target 22 congruent to the character shaped openings illuminated in the matrix and presented on target 22 as the cross section of electron beam 30. The size of the printed characters are predetermined so that a close or congruent size relationship is established between them and the size of the character shaped beams at the plane in the tube where these beams come in contact with the target 22. The relative positions of the printed characters on the card 36 may be predetermined so that the deflection characteristics of the tube 10, yoke 28, and associated circuitry may be, if desired, related thereto.

Although one particular type of beam forming character generating type of tube has been shown, the invention is not necessarily limited in this respect. Without adding or detracting from the present invention, it is entirely possible to employ other types of electron beam character writing devices. The shaped beams may, for example, be derived directly from a photocathode, or perhaps, a thermionic cathode generator of character shaped beams such as taught in my Patent 2,730,708 and in my copending application Serial No. 568,236, filed February 28, 1956. The electron images may also be produced by direct image or character writing with a focused spot sized beam of electrons upon target 22 as is well known in the art.

Circuitry necessary to operate the exemplified shaped beam tube 10 includes the following well known circuits shown in block diagram form on the drawing, namely, a character selection amplifier circuitry 40, which will supply deflection potentials to the deflection plate systems 16 and 20. Deflection plate system 16 deflects the beam 30 to illuminate desired openings in matrix 18 thereby shaping the electron beam into a cross section of the illuminated opening. Deflection plate system 20 deflects the shaped beam 30 to the electrooptical axis of tube 10 and places the beam 30 on axis at the plane of deflection of yoke 28. The deflection potentials applied to the deflection yoke 28 from deflection amplifier circuitry 44 effect control of the positioning of the shaped beams upon the target 22. The operating characteristics of the gun 14, the coil 26, the accelerator 42, and the potentials applied thereto, all influence the size of the character-shaped beam or predetermined image appearing at the target 22 of the tube 10.

When the system is in operation, card 36, containing the printed input to the system, in the form of predetermined images, will be placed in position between the light source 34 and the target 22. Exemplary well known operating circuitry may be utilized including, a sweep generator 46, of staircase control voltages, to apply signals to the deflection amplifier 44; a digital code generator 48, to supply a series of predetermined codes, such as binary code for example, to a binary-to-analog code converter 50, which converter 50, in turn, supplies control signals to the amplifier 40; and grid control circuits 52 to supply unblanking voltage pulses to the control grid of the electron gun 14. The character selection amplifier 40 and the digital code to analog converter 50, may utilize the construction and operation shown in application Serial No. 340,245, filed March 4, 1953, and assigned to the common assignee hereof. The various circuits referred to are electrically related and controlled, as is well known in the art, by means of a program of signals from a sync generator 54.

The card 36 contains a combination of the predetermined message characters or images, and each of these predetermined images has a counterpart generated at target 22 from the beam-forming member 18. Beam-forming member 18, may, for example, include a predetermined format of characters which, for example, may contain 64 different characters arranged in an 8-by-8 matrix. The code generator 48 may, in such an exemplary case, be made to provide a series of 6-element codes using well known circuitry as shown by Jacob Millman and Herbert Taub in their book entitled "Pulse and Digital Circuits,"

McGraw-Hill Book Company, Incorporated, New York 1956, pages 332 and 333, Figures 11-8 and 11-9, thereby permitting the matrix of 64 characters to be selected in rapid succession by the deflection potentials derived from these codes. A succession of characters or openings may be selected from the matrix 18, with the resultant beams of corresponding shapes or images being directed at the desired position on the target 22, by deflection yoke 28. A character or image from the card 36 is imaged by lens 38 upon the target 22 at about the same time, and if one of the 64 predetermined shapes appearing in the matrix 18 is congruent with or coincides with the card image, a coincidence occurs between the light projected image on the target 22 and one of the electron images from the 64 different character-shaped beams directed at the target. At the time of coincidence, a zero current flow results in conductor 32. In each and every other case that there was not congruency or coincidence of the light and electron images current flow from the beam through targets 22, 24 results to energize the gate 56, keeping it closed, and, isolating the code from code generator 48 from code output 58. Gate 56, when energized, prevents the digital code of generator 48 from reaching the output terminal 58. On the other hand, when a zero current condition exists in the conductor 32, the gate 56 is open and permits the code corresponding to the electron image effecting coincidence or congruency with the light image to be presented at the code output 58.

Therefore, unless there is a coincidence between the character image from the card 36 and the image of the character-shaped beam 30, the shaped beams will be of such cross-sectional configurations that electrons in the beam will be conducted to the conductive layer 24 by the illuminated conducting portions of the light responsive layer 22. Current flow to the gate 56, resulting therefrom, will keep gate 56 closed and prevent a passage of codes therethrough. When a coincidence of images does take place on target 22, and gate 56 opens, the 6-element code used to select that particular character image appears, of course, at the output terminal 58. Although only one terminal 58 and one gate 56 are shown in the diagram, it can be assumed, however, that if a 6-element code is generated in parallel, there may be six gates and also six output terminals in such a system.

The particular embodiment of the invention illustrated and described herein is illustrative only and the invention includes such other modifications and equivalents as may readily appear to those skilled in the art within the scope of the appended claims.

I claim:

1. A system for converting predetermined images into coded information comprising in combination, a cathode ray tube capable of generating and displaying a plurality of predetermined images upon a target, the tube including the target, the target in turn comprising an optically transparent electrically conducting layer disposed upon the tube and a light radiation responsive layer disposed upon the conducting layer, the responsive layer intercepting the images and being adapted to present a high electrical resistance in the absence of light radiation and a low electrical resistance in the presence of light radiation, means for optically projecting at least one of the predetermined images through the conducting layer onto the responsive layer, means capable of actuating the tube for effecting generation and display of the predetermined images, which actuating means includes a code generator, and means connected with the target and the code generator for providing an output of the generator upon establishment of coincidence of the images upon the target.

2. A system for converting predetermined images into coded information comprising in combination, a cathode ray tube capable of generating and serially displaying a plurality of predetermined images upon a target, the tube including the target, the target in turn comprises an optically transparent electrically conducting layer disposed upon the tube and a light radiation responsive layer disposed upon the conducting layer, the responsive layer intercepting the images, means for optically projecting at least one of the predetermined images through the conducting layer onto the responsive layer, means capable of actuating the tube for effecting generation and display of the predetermined images, which actuating means includes a binary code generator, and means connected with the target and the code generator for providing an output of the generator upon establishment of coincidence of the images upon the target.

3. A system for converting predetermined images into coded information comprising in combination, a cathode ray tube capable of generating and displaying a plurality of predetermined images upon a target, the images at the target having a predetermined configuration size, the tube including the target, the target in turn comprises an optically transparent electrically conducting layer disposed upon the tube and a light radiation responsive layer disposed upon the conducting layer, the responsive layer intercepting the images, means for optically projecting at least one of the predetermined images through the conducting layer onto the responsive layer of a configuration size substantially the same as the predetermined configuration size, means capable of actuating the tube for effecting generation and display of the predetermined images, which actuating means includes a code generator, and means connected with the target and the code generator for providing an output of the generator upon establishment of coincidence of the images upon the target.

4. A system for converting predetermined images into coded information comprising in combination, a shaped beam cathode ray tube capable of generating and displaying a plurality of predetermined images upon a target, the tube including the target, the target in turn comprises an optically transparent electrically conducting layer disposed upon the tube and a light radiation responsive layer disposed upon the conducting layer, the responsive layer intercepting the images, means for optically projecting at least one of the predetermined images through the conducting layer onto the responsive layer, means capable of actuating the tube for effecting generation and display of the predetermined images, which actuating means includes a code generator, and means connected with the target and the code generator for providing an output of the generator upon establishment of coincidence of the images upon the target.

5. A system for converting predetermined images into coded information comprising in combination, a cathode ray tube capable of continually generating and displaying in repetitive cycles a plurality of predetermined images upon a target, the tube including the target, the target in turn comprises an optically transparent electrically conducting layer disposed upon the tube and a light radiation responsive layer disposed upon the conducting layer, the responsive layer intercepting the images, means for optically projecting at least one of the predetermined images through the conducting layer onto the responsive layer, means capable of actuating the tube for effecting continual generation and display of repetitive cycles of the predetermined images, which actuating means includes a code generator, and means connected with the target and the code generator for providing an output of the generator upon establishment of coincidence of the images upon the target.

6. A system for converting predetermined images into coded information comprising in combination, a cathode ray tube capable of generating and displaying a plurality of predetermined images upon a target, the tube including the target, the target in turn comprises an optically transparent electrically conducting layer disposed upon the tube and a light radiation responsive layer disposed upon the conducting layer, the responsive layer intercepting the images, means adapted to optically project at least one of the predetermined images from a source, projecting the image through the conducting layer onto the responsive layer, means adapted to actuate the tube and effect generation and display of the predetermined images, which actuating means includes a code generator, and means connected with the target and the code generator, which last stated means is adapted to cause coded information output of the generator therethrough upon establishment of coincidence of the images upon the target, whereby the coinciding images are converted into coded information.

No references cited.